United States Patent
Kederer et al.

(10) Patent No.: US 8,069,885 B2
(45) Date of Patent: Dec. 6, 2011

(54) APPARATUS AND METHOD FOR DISPENSING LIQUID AND GASEOUS HYDROGEN

(75) Inventors: Tobias Kederer, Pullach (DE); Henning Tomforde, Sindelfingen (DE)

(73) Assignee: Linde Aktiengesellschaft, Munich (DE)

( * ) Notice: Subject to any disclaimer, the term of this patent is extended or adjusted under 35 U.S.C. 154(b) by 962 days.

(21) Appl. No.: 12/064,024

(22) PCT Filed: Jul. 25, 2006

(86) PCT No.: PCT/EP2006/007334
§ 371 (c)(1),
(2), (4) Date: Feb. 15, 2008

(87) PCT Pub. No.: WO2007/019948
PCT Pub. Date: Feb. 22, 2007

(65) Prior Publication Data
US 2008/0216913 A1 Sep. 11, 2008

(30) Foreign Application Priority Data
Aug. 18, 2005 (DE) .......................... 10 2005 039 202

(51) Int. Cl.
*B65B 3/04* (2006.01)
*B65B 1/04* (2006.01)
*F17C 7/04* (2006.01)

(52) U.S. Cl. .................. 141/104; 141/5; 141/9; 141/82; 141/95; 141/231; 62/48.1; 62/50.2

(58) Field of Classification Search .................. 141/4, 5, 141/9, 82, 95, 100, 104, 231; 62/48.1, 50.1, 62/50.2
See application file for complete search history.

(56) References Cited

U.S. PATENT DOCUMENTS

| | | | |
|---|---|---|---|
| 5,762,119 A * | 6/1998 | Platz et al. ..................... | 141/231 |
| 6,182,717 B1 * | 2/2001 | Yamashita ....................... | 141/82 |
| 6,598,624 B2 * | 7/2003 | Togasawa et al. .............. | 141/95 |
| 6,745,801 B1 | 6/2004 | Cohen et al. | |
| 6,755,225 B1 * | 6/2004 | Niedwiecki et al. .......... | 141/231 |

(Continued)

FOREIGN PATENT DOCUMENTS
EP 1 266 811 A2 12/2002
(Continued)

OTHER PUBLICATIONS
PCT/EP2006/007334 PCT/ISA/210.

*Primary Examiner* — Gregory Huson
*Assistant Examiner* — Nicolas A Arnett
(74) *Attorney, Agent, or Firm* — Crowell & Moring LLP

(57) ABSTRACT

A service station, in particular a hydrogen service station for filling a motor vehicle with a gaseous and/or a liquid medium, in particular with gaseous or liquid hydrogen, is disclosed. The station includes a) a reservoir for storing a liquid medium, b) a liquid medium dispensing unit which is supplied with the liquid medium from the reservoir, c) a compressor, an evaporator, a heating system, and an intermediate reservoir for intermediate storage of a compressed gaseous medium, d) a gaseous medium dispensing unit mounted downstream of the intermediate reservoir, e) a fuel cell which is supplied by the gaseous medium coming from the reservoir and/or the intermediate reservoir and supplies power to the compressor, and f) a control unit which is powered by the fuel cell and used for controlling the compressor, the gaseous medium dispensing unit and/or the liquid medium dispensing unit.

9 Claims, 2 Drawing Sheets

U.S. PATENT DOCUMENTS

| | | | |
|---|---|---|---|
| 6,786,245 B1 * | 9/2004 | Eichelberger et al. | 141/4 |
| 6,802,875 B1 * | 10/2004 | Kimbara et al. | 48/85.1 |
| 6,810,925 B2 * | 11/2004 | Graham et al. | 141/18 |
| 6,886,609 B2 * | 5/2005 | Cohen et al. | 141/231 |
| 7,059,364 B2 * | 6/2006 | Kountz et al. | 141/4 |
| 7,093,626 B2 * | 8/2006 | Li et al. | 141/231 |
| 7,128,103 B2 * | 10/2006 | Mitlitsky et al. | 62/50.2 |
| 7,168,465 B2 * | 1/2007 | Mitlitsky et al. | 141/231 |
| 7,178,565 B2 * | 2/2007 | Eichelberger et al. | 141/4 |
| 7,287,558 B2 * | 10/2007 | Hobbs | 141/98 |
| 7,328,728 B1 * | 2/2008 | Vilar | 141/231 |
| 7,363,949 B2 * | 4/2008 | Kubo et al. | 141/82 |
| 7,406,987 B2 * | 8/2008 | Takano et al. | 141/82 |
| 7,866,354 B2 * | 1/2011 | Kanoya et al. | 141/95 |
| 2005/0126195 A1 | 6/2005 | Horn et al. | |
| 2006/0156742 A1 * | 7/2006 | Farese et al. | 62/50.2 |
| 2006/0180235 A1 * | 8/2006 | Kubo et al. | 141/82 |
| 2006/0180240 A1 * | 8/2006 | Niedzwiechi et al. | 141/231 |

FOREIGN PATENT DOCUMENTS

| | | |
|---|---|---|
| EP | 1 517 079 A1 | 3/2005 |
| WO | WO 98/12763 | 3/1998 |
| WO | WO 02/064395 A2 | 8/2002 |
| WO | WO 03/032429 A2 | 4/2003 |
| WO | WO 03/075380 A1 | 9/2003 |
| WO | WO 2004/105212 A1 | 12/2004 |

* cited by examiner

APPARATUS AND METHOD FOR DISPENSING LIQUID AND GASEOUS HYDROGEN

This application claims the priority of International Application No. PCT/EP2006/007334, filed Jul. 25, 2006, and German Patent Document No. 10 2005 039 202.4, filed Aug. 18, 2005, the disclosures of which are expressly incorporated by reference herein.

BACKGROUND AND SUMMARY OF THE INVENTION

The invention relates to a service station, in particular to a hydrogen service station for filling a motor vehicle with a gaseous and/or liquid medium, in particular with gaseous and liquid hydrogen.

All conceivable types of vehicles such as passenger vehicles, trucks, busses, machines, locomotives, etc., which are fueled with gaseous and/or liquid media should be understood as "vehicle(s)" in the following.

Generic service stations are service stations that hitherto in a normal case are tied to a specific place, are dependent upon outside power and are also not free of emissions.

However, mobile service stations for liquid and/or gaseous hydrogen are in demand precisely in the demonstration or introduction phase of hydrogen as an energy reservoir for vehicles.

Until now, mobile refueling of hydrogen-operated vehicles was realized in that either liquefied or pressurized hydrogen was transported by means of tank vehicles to the refueling station and the vehicle was refueled with liquid or gaseous hydrogen there in a conventional manner.

The objective of the present invention is disclosing a generic service station for filling a motor vehicle with a gaseous and liquid medium, in particular with gaseous and liquid hydrogen, which avoids and/or overcomes the known disadvantages of mobile service station concepts.

To attain this objective, a service station, in particular a hydrogen service station, is provided for filling a motor vehicle with a gaseous and/or liquid medium, in particular with a gaseous and liquid hydrogen comprising:

a) a reservoir for storing a liquefied medium, in particular liquefied hydrogen, b) a liquid medium dispensing unit which is supplied with the liquefied medium from the reservoir, c) a compressor, an evaporator mounted upstream thereof, a heating system mounted downstream of the compressor, and an intermediate reservoir which is mounted downstream of the heating system and used for the interim storage of a compressed gaseous medium, d) a gaseous medium dispensing unit mounted downstream of the intermediate reservoir, e) a fuel cell which is supplied by the gaseous medium coming from the reservoir and/or the intermediate reservoir and supplies power to the compressor, and f) a control unit which is powered by the fuel cell and used for controlling the compressor, the gaseous medium dispensing unit and/or the liquid medium dispensing unit.

Additional advantageous embodiments of the inventive service station are characterized in that:

the evaporator and/or the heating system is/are embodied as an air evaporator, the compressor for compressing the liquid medium is designed for a pressure of up to 1000 bar and the intermediate reservoir is designed for storing the compressed gaseous medium at a pressure of up to 1000 bar, and the liquid medium dispensing unit is provided with a pump.

The inventive service stations well as additional embodiments of the service station are explained in greater detail in the following on the basis of the exemplary embodiments depicted in FIGS. 1 and 2.

DETAILED DESCRIPTION OF THE DRAWINGS

Figure 1:
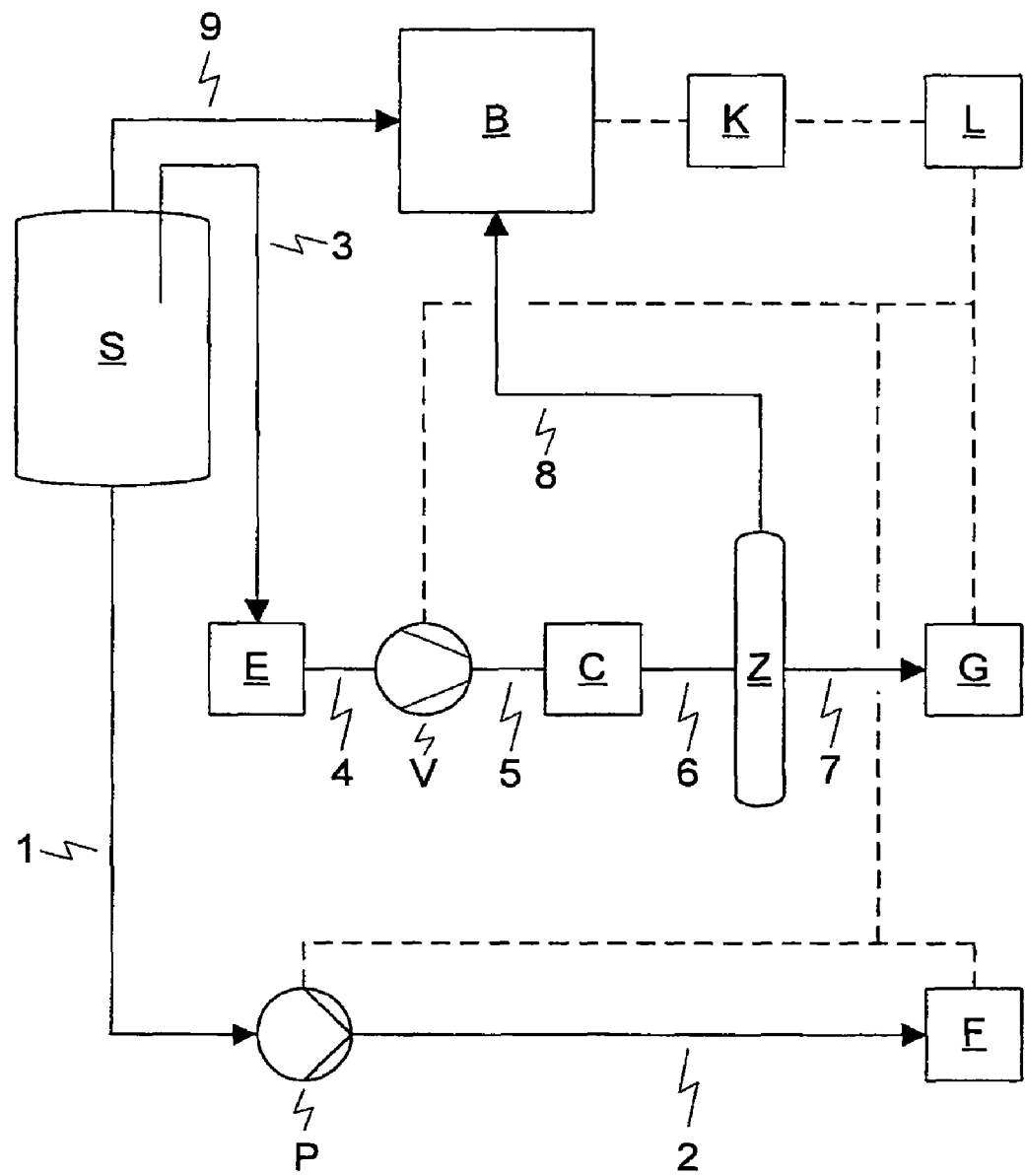
FIG. 1 illustrates an embodiment of a hydrogen service station in accordance with the principles of the present invention.

FIG. 1 shows a diagram of a hydrogen service station. The service station features a reservoir S, which is used for the storage of liquefied hydrogen and which, as a rule, has a maximum capacity of 1000 liters liquid hydrogen, which corresponds to approx. 786 $Nm^3$.

Furthermore, two dispensing units or dispensers G and F are provided, which can be used to dispense gaseous hydrogen (dispensing unit G) and liquid hydrogen (dispensing unit F) to the vehicle being refueled.

The liquid hydrogen is supplied from the reservoir S to the dispensing unit F via line sections 1 and 2, in which, corresponding to an advantageous embodiment of the inventive service station, a suitable low-temperature pump P can be provided.

An evaporator E, a cryo-compressor V, a heating system C and an intermediate reservoir Z are connected upstream from the gaseous hydrogen dispensing unit G in the direction of flow. The evaporator E and/or the heating system C is/are preferably embodied as an air evaporator.

According to an advantageous embodiment of the inventive service station, the previously described intermediate reservoir Z is designed for pressures up to 1000 bar. Currently, the first inventive service stations are projected with pressure circumstances of up to 500 bar. However, the intention is to also realize pressure circumstances of between 700 and 1000 bar.

The fueling of vehicles that are operated with gaseous hydrogen is accomplished via cascade pressure equalization between the intermediate reservoir Z and the vehicle tank via line section 7 as well as the dispensing unit G. Filling the intermediate reservoir Z takes place, in turn, via line sections 3, 4 and 5 as well as via the cryo-compressor V, which makes possible an increase in the pressure of the hydrogen that is evaporated before the cryo-compressor V and withdrawn from the reservoir S to the desired (intermediate) reservoir pressure or dispensing pressure of the gaseous stored hydrogen.

Gaseous hydrogen accumulating within the reservoir S and/or the intermediate reservoir Z is withdrawn from the aforementioned reservoirs via lines 8 and/or 9 and supplied as feedstock to a fuel cell B, which is used as a power source for the inventive service station. The direct current obtained in the fuel cell B is converted to alternating current in a DC/AC converter K, which is used to supply the control unit L and the cryo-compressor V. The control unit L in turn triggers the dispensing units G and F as well as the compressor V and/or their drives (depicted by the dashed lines).

Figure 2:
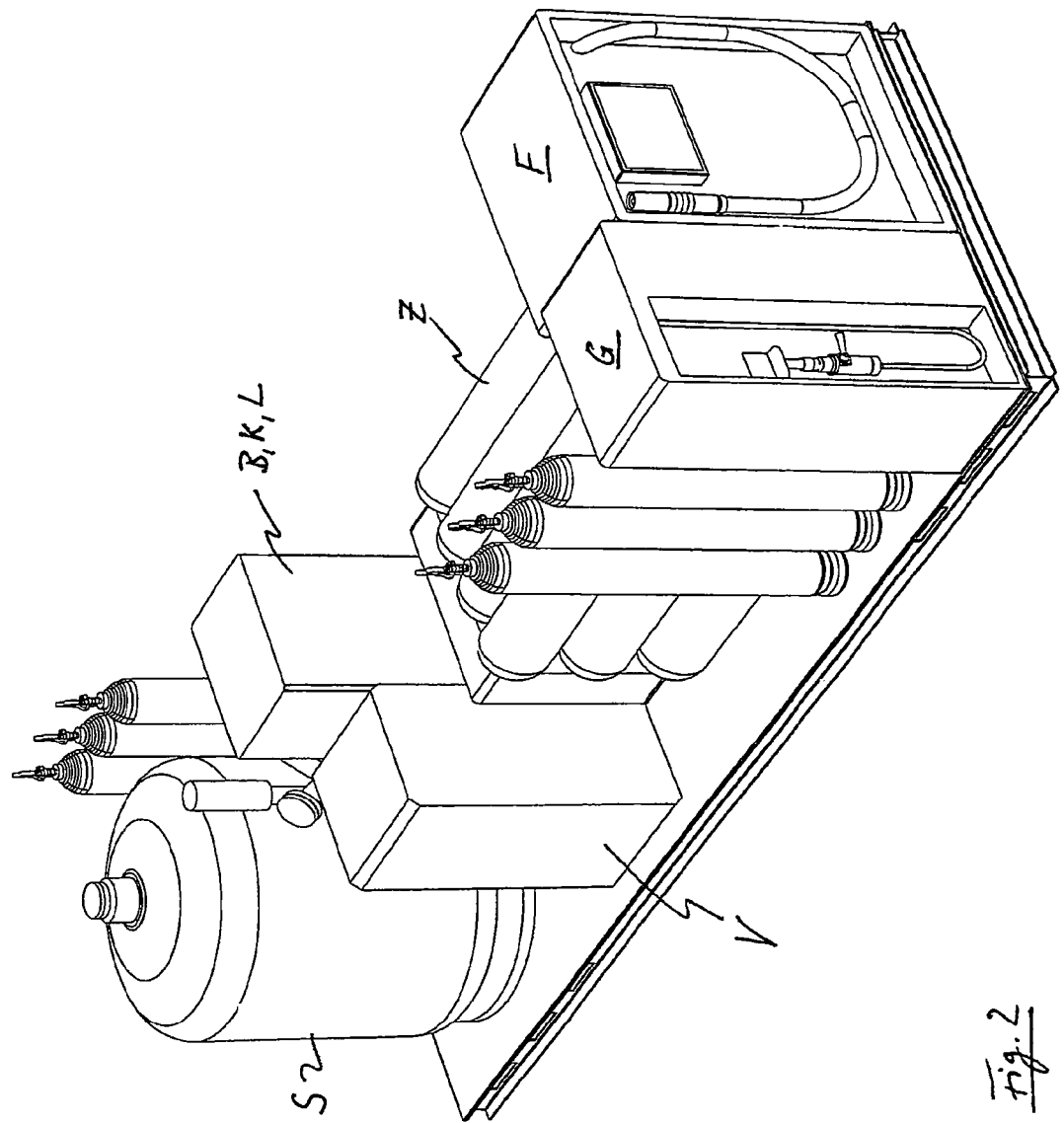
FIG. 2 illustrates an embodiment of an arrangement of a service station in accordance with the principles of the present invention.

FIG. 2 depicts a possible arrangement of the previously described components or units of the inventive service station, such as those that may be arranged on a pallet than can be transported by means of a truck for example.

The invention creates a mobile, self-sufficient and emission-free service station, in particular a hydrogen service station, which, with appropriate dimensioning, can be transported for example on or by means of a transport vehicle or small truck. As a result, it is possible to quickly and arbitrarily change location at any time, even to comparatively remote sites. Moreover, in contrast to previously known mobile hydrogen service stations, it is possible to realize simultaneous refueling of vehicles with gaseous and liquid hydrogen.

The invention claimed is:

1. A service station for filling a motor vehicle with a gaseous and/or a liquid medium, comprising:
    a) a reservoir for storing the liquid medium;
    b) a liquid medium dispensing unit which is supplied with the liquid medium from the reservoir;
    c) a compressor, an evaporator mounted upstream of the compressor, a heating system mounted downstream of the compressor, and an intermediate reservoir which is mounted downstream of the heating system and used for interim storage of a compressed gaseous medium;
    d) a gaseous medium dispensing unit mounted downstream of the intermediate reservoir;
    e) a fuel cell which is configured for supply with gaseous medium coming from the reservoir and the intermediate reservoir and for supplying power to the compressor; and
    f) a control unit which is powered by the fuel cell and which controls the compressor, the gaseous medium dispensing unit, and/or the liquid medium dispensing unit.

2. The service station according to claim 1, wherein the evaporator and/or the heating system is/are embodied as an air evaporator.

3. The service station according to claim 1, wherein the compressor for compressing evaporated gaseous medium from the evaporator is designed for a pressure of up to 1000 bar and the intermediate reservoir is designed for storing the compressed gaseous medium at a pressure of up to 1000 bar.

4. The service station according to claim 1, wherein the liquid medium dispensing unit is provided with a pump.

5. A hydrogen service station for filling a motor vehicle with gaseous and liquid hydrogen, comprising:
    a) a reservoir which stores the liquid hydrogen;
    b) a liquid hydrogen dispensing unit which is supplied with the liquid hydrogen from the reservoir;
    c) a compressor, an evaporator mounted upstream of the compressor and coupled to the reservoir, a heating system mounted downstream of the compressor, and an intermediate reservoir mounted downstream of the heating system, wherein the intermediate reservoir stores gaseous hydrogen from the reservoir and as compressed by the compressor;
    d) a gaseous hydrogen dispensing unit coupled to the intermediate reservoir;
    e) a fuel cell which is configured for supply with gaseous hydrogen from the reservoir and the intermediate reservoir and for supplying power to the compressor; and
    f) a control unit which is powered by the fuel cell and which controls the compressor, the gaseous hydrogen dispensing unit, and/or the liquid hydrogen dispensing unit.

6. The hydrogen service station according to claim 5, wherein the reservoir, the intermediate reservoir, the liquid hydrogen dispensing unit, the gaseous hydrogen dispensing unit, the fuel cell, the control unit, the evaporator, the compressor, and the heating system are mounted on a pallet and wherein the pallet is placed on a truck.

7. A method for dispensing gaseous and liquid hydrogen, comprising the steps of:
    a) storing the liquid hydrogen in a reservoir;
    b) dispensing the liquid hydrogen from the reservoir by a liquid hydrogen dispensing unit coupled to the reservoir;
    c) compressing gaseous hydrogen from the reservoir and providing the compressed gaseous hydrogen to an intermediate reservoir;
    d) dispensing the compressed gaseous hydrogen from the intermediate reservoir by a gaseous hydrogen dispensing unit coupled to the intermediate reservoir;
    e) supplying gaseous hydrogen to a fuel cell from the reservoir and/or the intermediate reservoir;
    f) supplying power to the compressor and a control unit by the fuel cell; and
    g) controlling the compressor, the liquid hydrogen dispensing unit, and the gaseous hydrogen dispensing unit by the control unit.

8. The method according to claim 7, wherein the liquid hydrogen and the compressed gaseous hydrogen are dispensed to a motor vehicle.

9. The method according to claim 7, further comprising the steps of mounting the reservoir, the intermediate reservoir, the liquid hydrogen dispensing unit, the gaseous hydrogen dispensing unit, the fuel cell, and the control unit on a pallet and transporting the mounted reservoir, intermediate reservoir, liquid hydrogen dispensing unit, gaseous hydrogen dispensing unit, fuel cell, and control unit on the pallet by a truck.

* * * * *